(No Model.) 2 Sheets—Sheet 1.
H. W. BROWN.
PIPE OR CABLE SUPPORTING DEVICE.
No. 420,767. Patented Feb. 4, 1890.
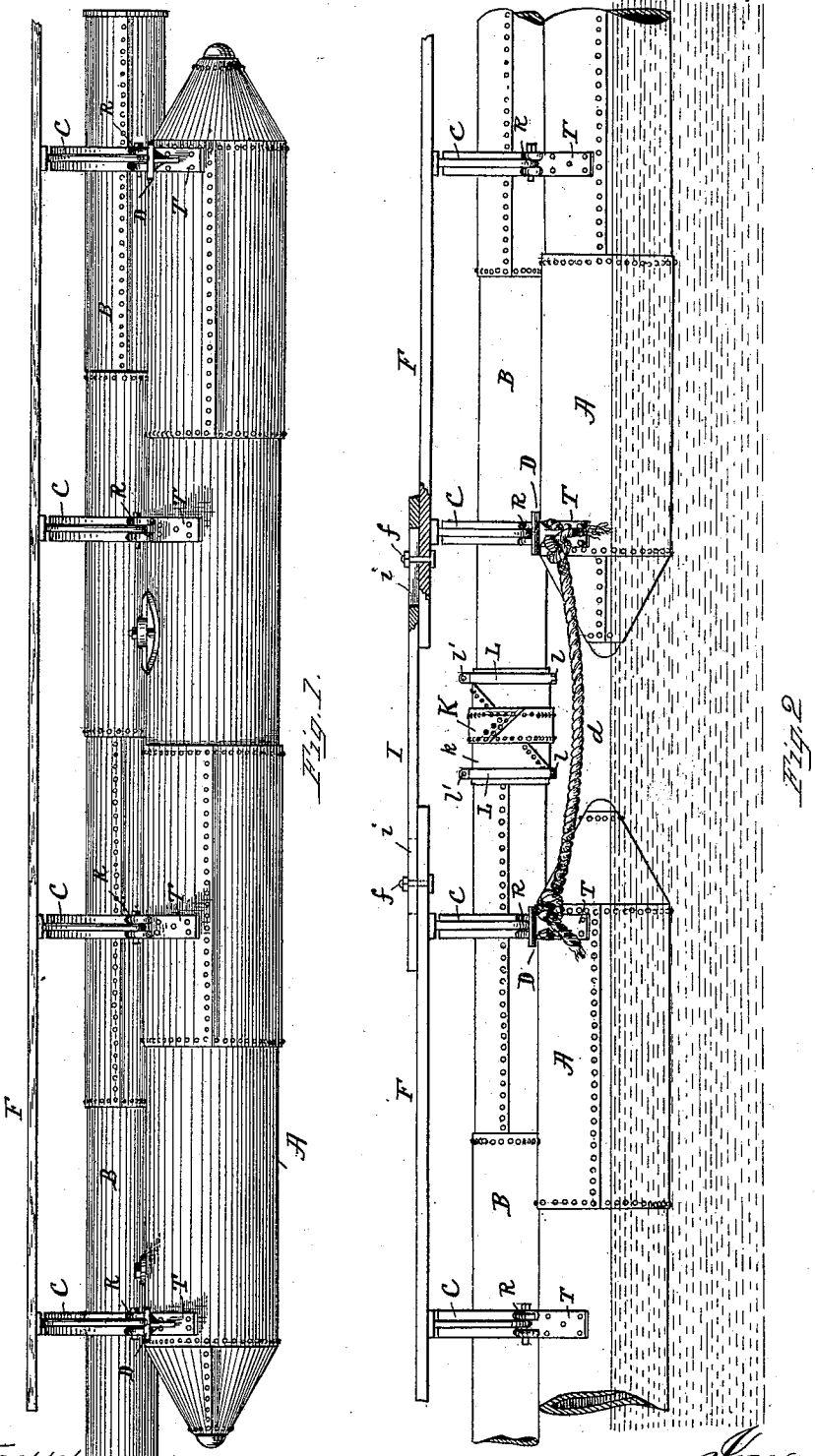
Witnesses
Karl B. Andrén.
Martha J. Jackson.
Inventor
Henry W. Brown
by Alvan Andrén his atty.

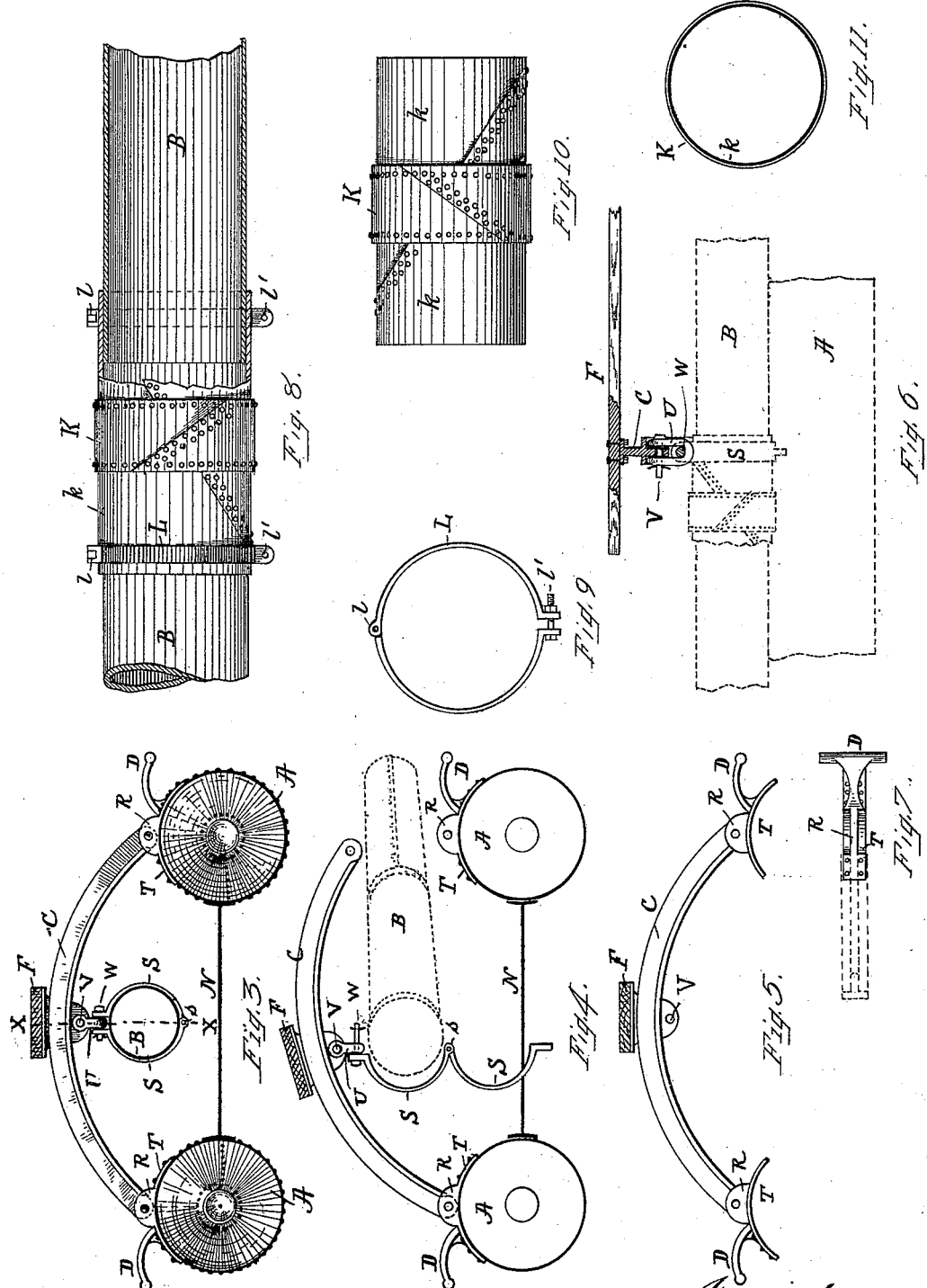

UNITED STATES PATENT OFFICE.

HENRY W. BROWN, OF CAMBRIDGEPORT, MASSACHUSETTS.

PIPE OR CABLE SUPPORTING DEVICE.

SPECIFICATION forming part of Letters Patent No. 420,767, dated February 4, 1890.

Application filed November 5, 1889. Serial No. 329,281. (No model.)

*To all whom it may concern:*

Be it known that I, HENRY W. BROWN, a citizen of the United States, and a resident of Cambridgeport, in the county of Middlesex and State of Massachusetts, have invented new and useful Improvements in Pipe or Cable Supporting Devices, of which the following, taken in connection with the accompanying drawings, is a specification.

This invention relates to improvements in pipe or cable supporting devices for the purpose of temporarily or permanently suspending pipes, cables, or electric wires above the sea-level, as may be desired where such pipes, cables, &c., have to be conducted across a bay, river, or other water-surface.

The invention is particularly well adapted for the purpose of supporting dredging-pipes used in connection with hydraulic dredging apparatus for dredging sea-bottoms by means of a rotary pump, and conveying the dredging materials through such pipes to any desired place—for instance, in reclaiming lands, building sea-walls, dikes, wharves, &c., or for other similar or equivalent purposes—as will hereinafter be more fully shown and described, reference being had to the accompanying drawings, where—

Figures 1 and 2 represent side elevations of the improved apparatus, the latter figure showing the manner of joining the pipe ends together. Fig. 3 represents an end elevation of the apparatus, showing the pipe suspended thereon when in use. Fig. 4 represents a similar end elevation, showing the pipe-supporting ring or band expanded for receiving the pipe to be supported. Fig. 5 represents a detail side elevation of one of the hinged braces that connect the hollow floats. Fig. 6 represents a cross-section on the line X X, shown in Fig. 3. Fig. 7 represents a plan view of Fig. 5, the hinged brace being shown as removed. Fig. 8 represents a side elevation of a pair of abutting pipes and the flexible joint by means of which such pipes are connected. Fig. 9 represents an end view of one of the bands by means of which the pipe ends are secured to the flexible joint. Fig. 10 represents a detail side elevation of the said flexible joint, and Fig. 11 represents a cross-section of the same.

Similar letters refer to similar parts wherever they occur on the different parts of the drawings.

The apparatus consists of a series of hollow air-tight floats A A, or catamarans, arranged in pairs, as shown, each pair being connected at a proper distance apart by means of rigid stays N N. (Shown in Figs. 3 and 4.) Said hollow air-tight floats are preferably made of sheet metal, cylindrical in form, with conical ends, as shown in Figs. 1 and 2; but I do not wish to confine myself to this precise arrangement, as said floats may be made of other shape and material without departing from the essence of my invention. To such floats are secured a suitable number of ears R R, to which are hinged or pivoted in a detachable manner the pipe-supporting braces C C, as shown. Said braces are preferably made arched, as shown in Figs. 3, 4, and 5; but this is not essential, as they may be made of other suitable forms without departing from the spirit of my invention. Said ears R are preferably cast in one piece with or secured to a flange T, which is riveted to the respective floats, as shown in Figs. 3, 4, 5, and 7.

D D are cleats, preferably made in one piece with each of the flanges T T; but this is not essential, as said cleats may be secured independently of such flanges to the floats A A, if so desired. Such cleats serve for the purpose of connecting one of the floats to the one ahead of it in the series by means of suitable ropes or chains *d d*, so as to keep the floats at proper distances apart. If the pipe or cable to be supported is to be arranged in a straight line, I make the ropes or chains equal between the pairs of floats; but if it is desired to locate the said pipe or cable in a curved position I make such connecting ropes or chains of unequal lengths between the opposite series of floats, more or less, according to the curvature of the pipe or cable desired.

On the under side of each brace C is hinged at V the shackle U, and to the latter is hinged, by means of a pin W, the ears of the semicircular parts of the pipe-supporting band S S, which semicircular parts are hinged together at *s*, as shown.

B represents the pipes adapted to be supported in the bands S S, said pipes being made in lengths about equal to the floats A A, and having their ends connected by means of the flexible tube $k$, preferably made of leather, said flexible tube being connected to the ends of the pipes B B, preferably by means of metal bands L, composed of two parts hinged together at $l$, and clamped together by means of a screw-bolt $l'$, as shown in Figs. 8 and 9.

In practice I prefer to provide the flexible leather joint $k$ with a central re-enforcing ring or annulus K, (shown in Figs. 2, 8, 10, and 11,) for the purpose of strengthening said joint between the ends of the pipes B B, as shown.

When it is desired to suspend the pipe B from the braces C, I disconnect the bolt W from one of the ears of the hinged band S, as shown in Fig. 4. The pipe B is then introduced into said band S and secured in position, as shown in Fig. 3, by connecting the bolt W to the ears of the hinged band S, as shown in Fig. 3, and when so connected the pipe is universally jointed to the braces C C, by which arrangement the pipe B is kept level, or nearly so, during the rise or fall of the floats A A.

To the upper portion of the braces C C are secured the planks F in lengths about equal to the floats A, as shown, the adjoining ends of such planks being connected to an intermediate plank I, provided, preferably, with longitudinal slots $i$, through which and perforations in the planks F pass the fastening-bolts $f$, as shown in Figs. 1 and 2. Said plank-pieces I and the fastening-bolts serve for the purpose of holding one set of floats at a proper distance from those in front or rear either in a straight or curved line, and thus relieving any undue strain on the pipe or cable that is to be supported from the braces C C.

The planks F F and I serve as a continuous walk for the operatives while adjusting the pipes, attaching or detaching them from their supports, or for tending or adjusting the floats or their connections as may from time to time be needed.

Having thus fully described the nature, construction, and operation of my invention, I wish to secure by Letters Patent and claim—

1. In a pipe or cable supporting device, a series of hollow floats arranged in pairs secured at a proper distance apart, combined with braces C C, hinged to the hollow floats, substantially as and for the purpose set forth.

2. In a pipe or cable supporting device, a series of hollow floats arranged in pairs and having hinged braces, as described, combined with universally-jointed rings or bands for supporting the pipe or cable, substantially as and for the purpose set forth.

3. In a pipe or cable supporting device, a series of hollow floats arranged in pairs, combined with hinged braces having secured thereto the planks F F and the intermediate adjustable planks I, substantially as and for the purpose set forth.

4. In a pipe or cable supporting device, a series of hollow floats arranged in pairs, and the hinged or detachable braces thereon, as described, combined with the planks F F I, the cleats D D, and ropes or chains $d\ d$, substantially as and for the purpose set forth.

5. The hollow floats A A, their braces C C, and universally-jointed supporting-rings S S, combined with the pipes B B, flexible connecting-tube $k$, its re-enforcing annulus K, and the clamping-rings L $l\ l'$, substantially as and for the purpose set forth.

In testimony whereof I have signed my name to this specification, in the presence of two subscribing witnesses, on this 22d day of October, A. D. 1889.

HENRY W. BROWN.

Witnesses:
ALBAN ANDRÉN,
LUKE E. JENKINS.